United States Patent [19]

Becker

[11] 4,155,798

[45] May 22, 1979

[54] PROTECTION FROM CORROSION OF RESISTANCE-WELDED SHEET METAL COVERED WITH NON-METALLIC LAYERS

[76] Inventor: Otto A. Becker, 59 Robert-Koch-Strasse, 6 Saarbrücken 6, Fed. Rep. of Germany

[21] Appl. No.: 650,853

[22] Filed: Jan. 21, 1976

Related U.S. Application Data

[60] Division of Ser. No. 307,836, Nov. 20, 1972, Pat. No. 3,947,614, which is a continuation of Ser. No. 56,197, Jul. 13, 1970, abandoned, which is a continuation of Ser. No. 681,694, Nov. 9, 1967, abandoned.

[30] Foreign Application Priority Data

| Nov. 11, 1966 [DE] | Fed. Rep. of Germany | 89773 |
| Feb. 6, 1967 [DE] | Fed. Rep. of Germany | 91065 |
| Feb. 11, 1967 [DE] | Fed. Rep. of Germany | 91162 |
| Jul. 29, 1967 [DE] | Fed. Rep. of Germany | 93710 |
| Sep. 2, 1967 [DE] | Fed. Rep. of Germany | 94270 |

[51] Int. Cl.² ............................................. B65H 31/00
[52] U.S. Cl. ................................... 156/461; 156/216; 156/486; 156/499; 156/522; 156/577

[58] Field of Search .............. 156/216, 577, 522, 227, 156/461, 107, 109, 486, 499

[56] References Cited

U.S. PATENT DOCUMENTS

| 2,916,079 | 12/1959 | Schiefer | 156/216 X |
| 3,038,982 | 6/1962 | Ludlow | 156/216 X |
| 3,473,988 | 10/1969 | Rullier et al. | 156/107 |
| 3,886,013 | 5/1975 | Bowser et al. | 156/577 X |
| 3,939,034 | 2/1976 | Tanaka et al. | 156/522 |
| 3,988,192 | 10/1976 | Landis et al. | 156/522 X |

FOREIGN PATENT DOCUMENTS

1447491  8/1976  United Kingdom .................... 156/216

Primary Examiner—David A. Simmons
Attorney, Agent, or Firm—Donald D. Jeffery

[57] ABSTRACT

The present invention relates to the protection of blank areas of sheet metal otherwise coated with layers of synthetic materials, lacquers, foils or the like, wherein apparatus is provided for covering the blank areas with tape or cord by temporarily moving a means for applying the tapes or cords towards, along and away from the sheet material and, if desired, pressing the same on and-/or drying the same on the sheet metal.

10 Claims, 30 Drawing Figures

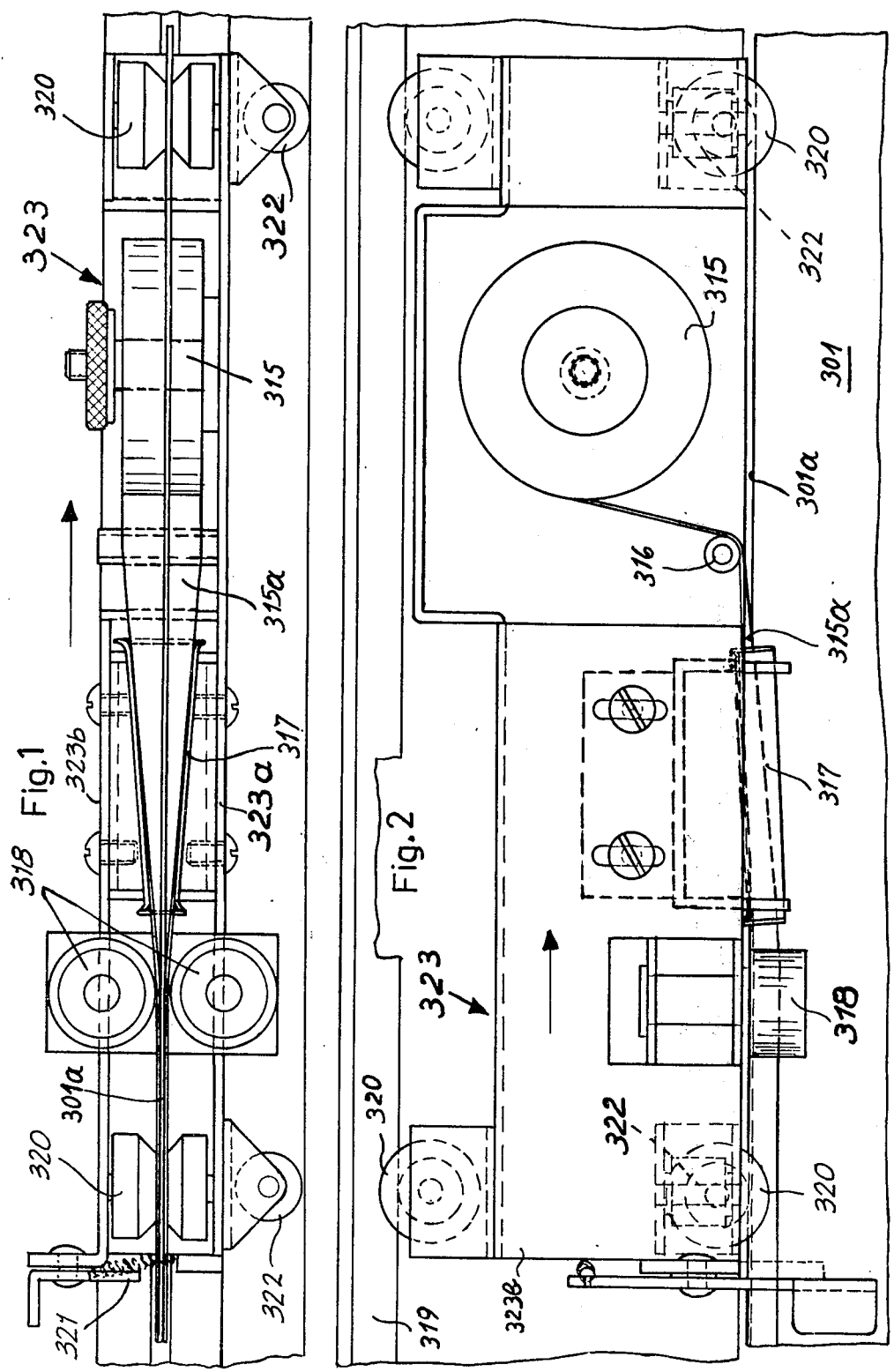

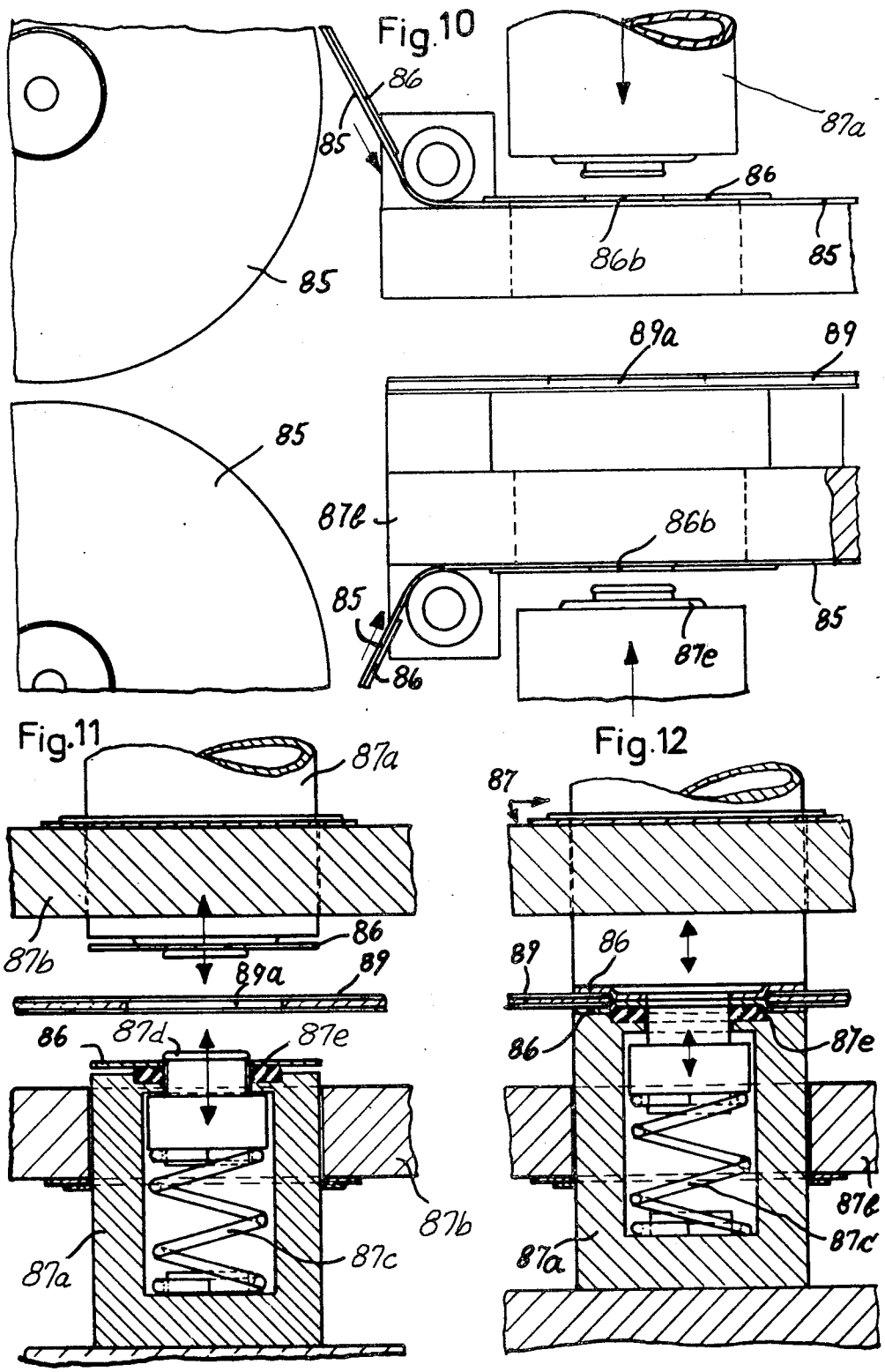

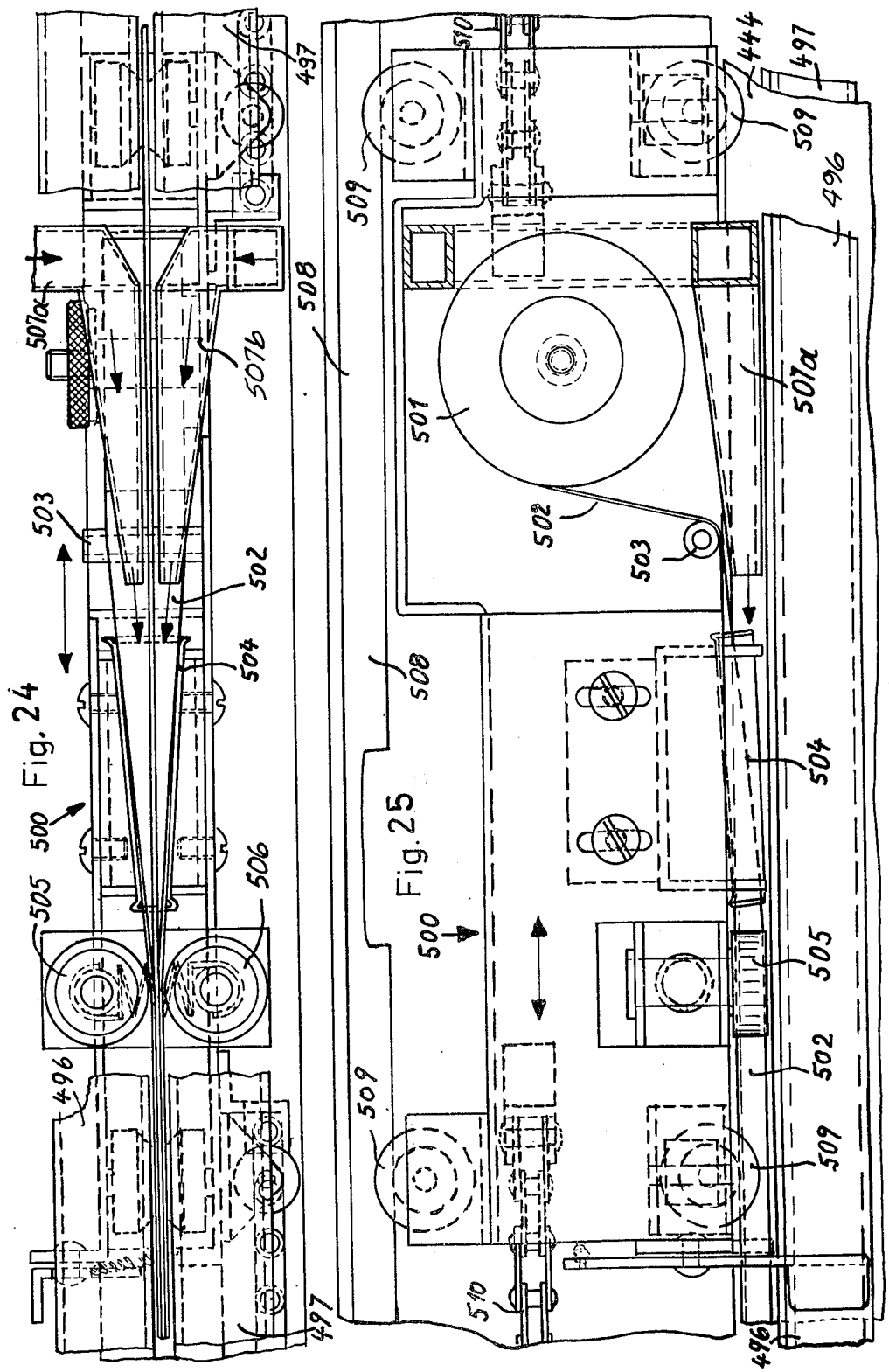

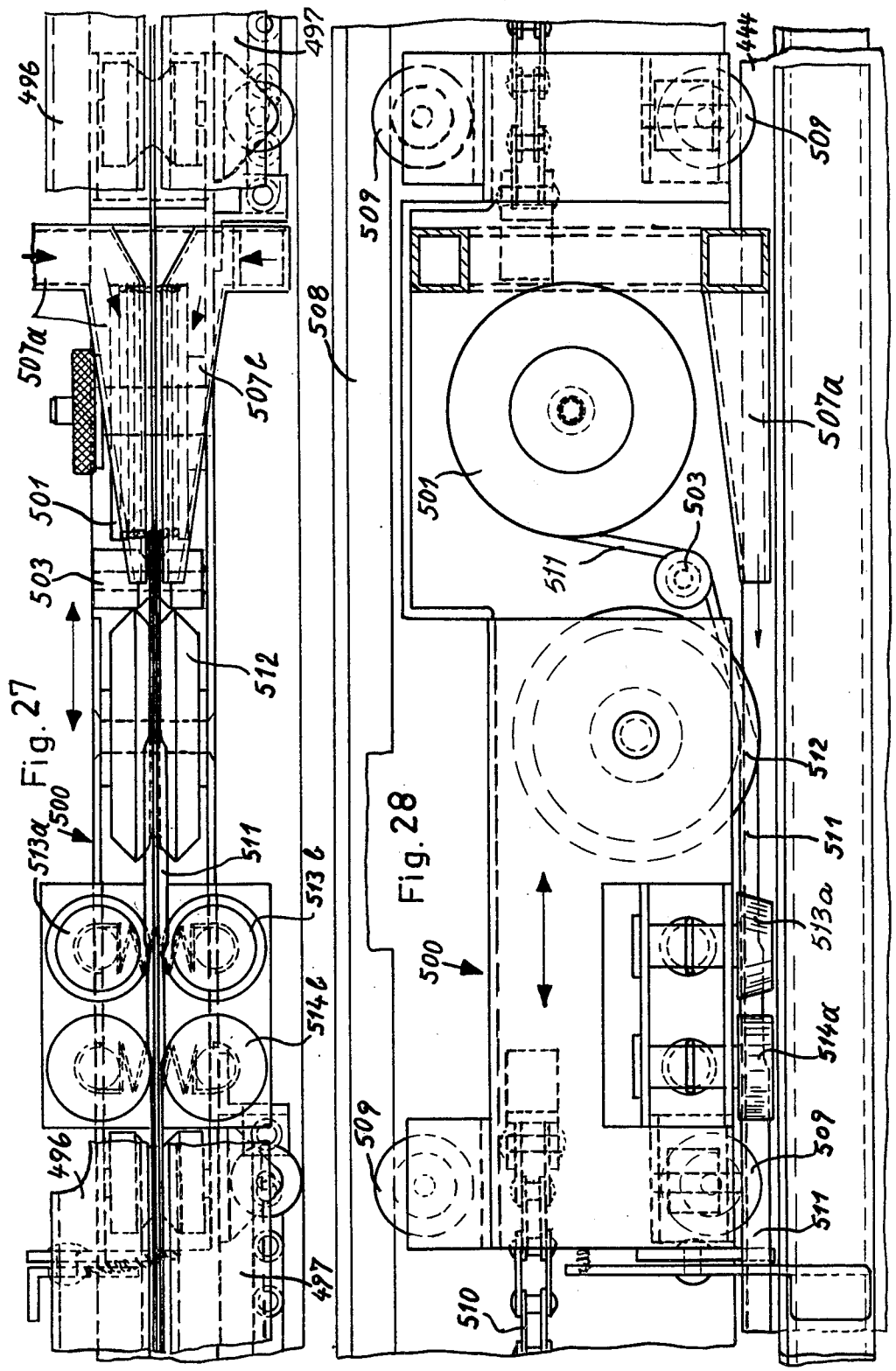

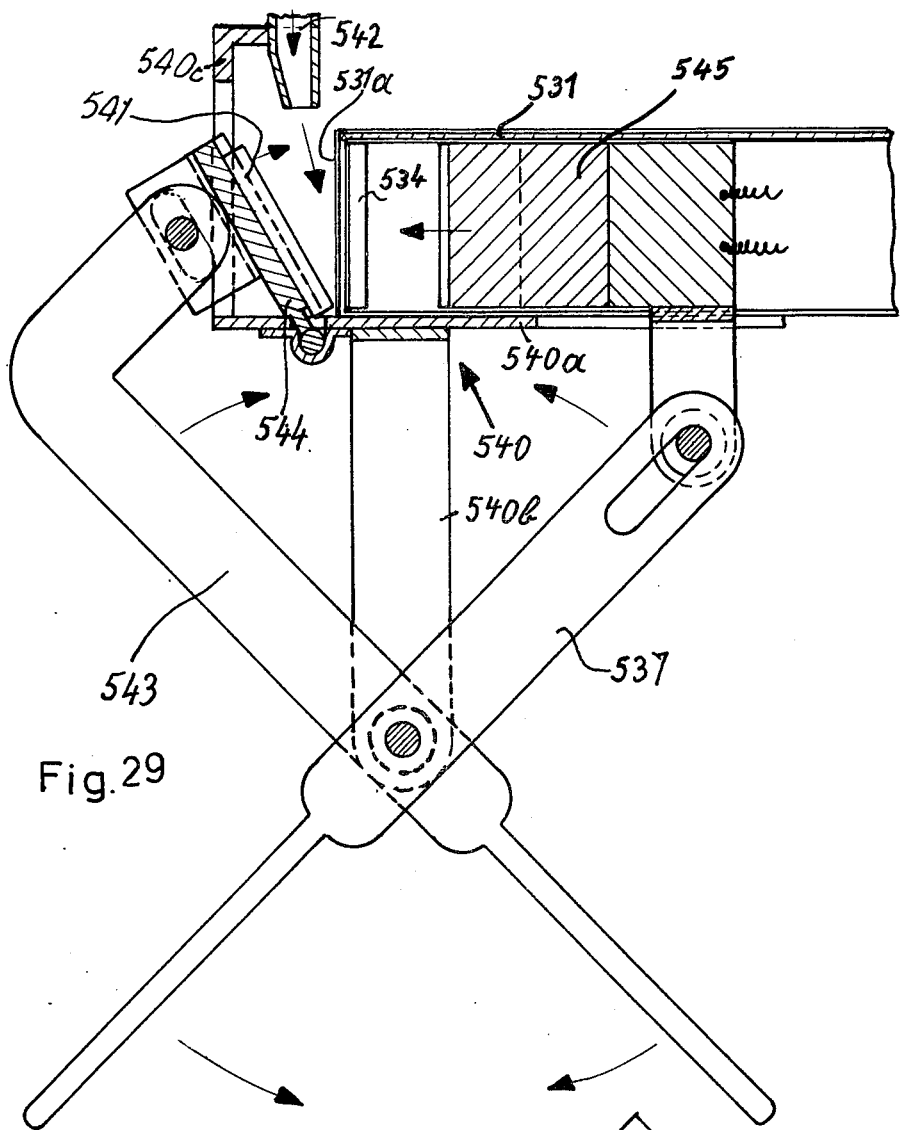
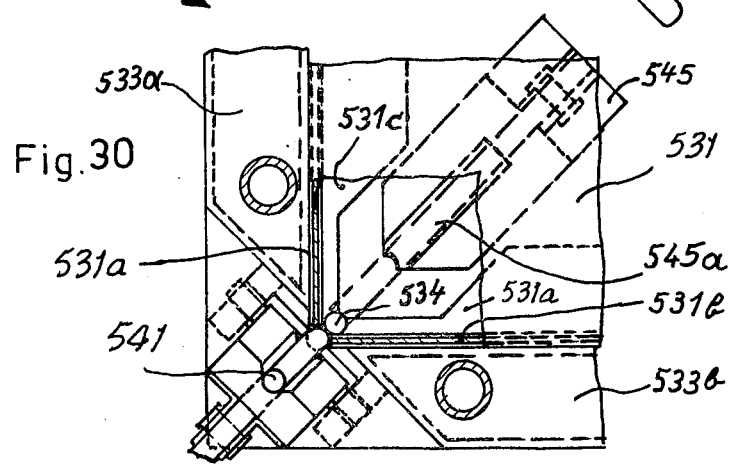

PROTECTION FROM CORROSION OF RESISTANCE-WELDED SHEET METAL COVERED WITH NON-METALLIC LAYERS

This is a division of application Ser. No. 307,836, filed Nov. 20, 1972, and now U.S. Pat. No. 3,947,614 issued Mar. 30, 1976, which is a continuation of application Ser. No. 56,197 filed July 13, 1970 and now abandoned, and which is a continuation of application Ser. No. 681,694 filed Nov. 9, 1967 and now abandoned.

BACKGROUND OF THE INVENTION

Sheet metal is usually protected from corrosion by being covered with lacquer. However, on the one hand it is difficult, to produce a faultless lacquer surface, and on the other hand the coating of lacquer is little resistant to scratching and impacts and is soon destroyed at weak spots by rust creeping under it. A much more durable protection is constituted by foils of synthetic material, which are cemented hot on the sheet metal, or layers of synthetic material, which are rolled as a pasty mass on the sheet metal. Such layers are resistant to impact, and can be produced in many different colours. They may, moreover, be made with patterns, texture and grains. Their use involves many advantages, but their economic treatment constitutes difficulties. They can be welded only, when the layer is removed from the areas to be welded. In order to restore a closed surface layer these areas have to be closed again. For this purpose no economically bearable methods have been available yet, so that coated sheet metal is used but little, in spite of its advantages. Since only the surfaces of the sheet metal are coated with layers, their edges remain uncoated, and so are likewise the cut edges formed when cutting the sheet metal to shape. In order to attain a perfect and durable protection from rusting, the edges of sheet metal have also to be covered.

Accordingly there exists the problem of protecting sheet metal, covered in various ways, on the blank or stripped areas thereof from corrosion, and to re-coat the same there, so that the work piece has on all sides a perfect rust-protecting layer. Moreover, machines and devices are to be developed which allow a quick and economic applying of the rust-protection, and which in particular can be fitted into a production line for mass production.

SUMMARY OF THE INVENTION

A coating resistant to scratching and impacts is applied by the cementing-on of tapes preferably consisting of the same foils as those which serve for coating the sheet metal. Advantageously the tape has been previously provided with adhesive, i.e. a self-adhesive tape is used, which is only to be applied and to be pressed on. In a first device, a reel of adhesive tape is mounted on a carriage, which is guided by rollers between the edge to be covered of the sheet metal and a rail lying parallel thereto. The adhesive tape drawn from the reel is folded about the edge of the sheet metal by a prefolding funnel, and is pressed by two presser-rollers onto the upper- and under-side of the stripped area of the sheet metal panel, and is cut off at the end of the sheet metal edge. In a second device, for edges positioned transversely of the direction of transport of the sheet metal panel, the carriage is pulled by means of a chain by a motor. In a third embodiment, the adhesive tape is stretched out by two rollers lying one above the other; the edge of the sheet metal panel is pushed towards the middle of the tape and is then pushed together with the tape folding itself between the rollers, whereby the tape is pressed on. For projecting or receding portions of the edge, e.g. a triangular cut-out in the edge, an orifice of corresponding shape with clamping jaws is provided, in front of which the adhesive tape is stretched out. When pressing on the tape, blades make incisions in the tape in such a manner that the tape can be folded about the edges. Holes in the surface of the sheet metal have likewise bare edges. For the purpose of covering the holes, an adhesive disc from below, and an adhesive disc from above, are cemented on the edges of the hole, and within the hole the two adhesive discs are cemented on one another. For treatment on a machine, the adhesive discs are firstly cemented on a tension belt, one such belt being stretched out above and one below the holes in the sheet metal; the adhesive discs are punched out, and are pressed against the sheet metal and against each other. The tension belt can be pulled along step-wise by a winding-on reel. In a modification, an expandable adhesive ring is pressed with its outer edge against the edge of the hole; then it is bent with its inner portion through the hole; and finally pressed on the opposite edge of the hole. For this purpose a compressed air cylinder is provided with an elastically inflatable upper portion, and is compressible between a holder ledge and an opposite ledge.

Tapes or cords of synthetic material are heated, together with the adjacent layers, to their welding temperature, and are then interwelded by pressing. The heating may be effected by infra-red radiation. In a machine with a stretched-out weldable tape and with the edge of the sheet metal standing in front of the same, the infra-red radiators are formed arcuate, and are arranged in front of the tape and above as well as below the sheet metal edge. When the welding temperature of the tape is reached, the sheet metal is automatically pushed against the tape and between presser rollers, and the tape is thus interwelded with it. The heating may alternatively be effected by a hot air blower. On a carriage guided along the sheet metal edge and carrying a tape reel, pre-folding funnel and presser rollers, a hot air blower is mounted, whose upper and lower outlet nozzles extend along the sheet metal edge and blow the hot air into the pre-folding funnel. Instead of a weldable tape, a weldable cord could be used. The heated cord is firstly pressed against the edge by a presser roller, and is then welded to the sheet metal edges by means of a pair of form rollers as well as by a pair of presser rollers. Finally the welding temperature may be established by electrically heated elements. For the coating of a gap in the corner between two mutually abutting angular turn-ups, a piece of weldable cord and an electrically heated form member filling that corner are inserted. The gap in the corner can be covered from outside with a piece of weldable cord by the aid of a pivotable form member. The form members are guided or pivoted on a support platform for the work piece, and can be pressed on by means of levers. The layers adjacent to the welded zones are protected from overheating by cooling plates or by water-cooled tubes.

Protection from corrosion can be attained also on formed sheet metal panels interwelded into finished products e.g. the doors of a motor car body. For this purpose the applying device extends all round along the edges, forming a frame. For arcuate edges, the adhesive tape is pressed on from outside by means of a carriage guided on rails, and is folded over the edges by a roller.

With straight edges, the adhesive tape is stretched out in a simple way over the edges by the aid of a tension belt and of a winding-up reel. The applied and stretched-out adhesive tapes are folded over the edges and pressed on by means of clamping jaws. These clamping jaws are mounted on a frame, which can be raised and lowered, and which may carry also the storage reels and the motor-driven winding-on reels. Inflatable hoses may serve as the presser means.

BRIEF DESCRIPTION OF THE DRAWINGS

In the accompanying drawings the devices and machines are shown, which are required for carrying out the invention.

FIGS. 1 and 2 show a device for the covering of edges with a tape drawn off a reel, for sheet metal edges lying in the direction of transport, in elevation and plan view, respectively, FIG. 10 shows a device for the punching-out and pressing-on of adhesive discs, before the punching, in elevation, FIG. 11 shows the same device after the punching, in part-sectional side elevation, FIG. 12 is a view corresponding to FIG. 11 during the pressing-on, FIG. 13 shows a piece of sheet metal with a hole, covered by two adhesive discs, in plan view, FIG. 16 shows the same device in side elevation when pressing-on.

FIGS. 24–26 show a similar device with hot air blower and a tape drawn off a reel, in elevation, plan view and transverse section, respectively.

FIGS. 27 and 28 show a similar device with a weldable cord in elevation and plan view, respectively, FIGS. 29 and 30 show a welding device for a corner gap in sectional elevation and plan view, respectively,

DETAILED DESCRIPTION

Figure 3:
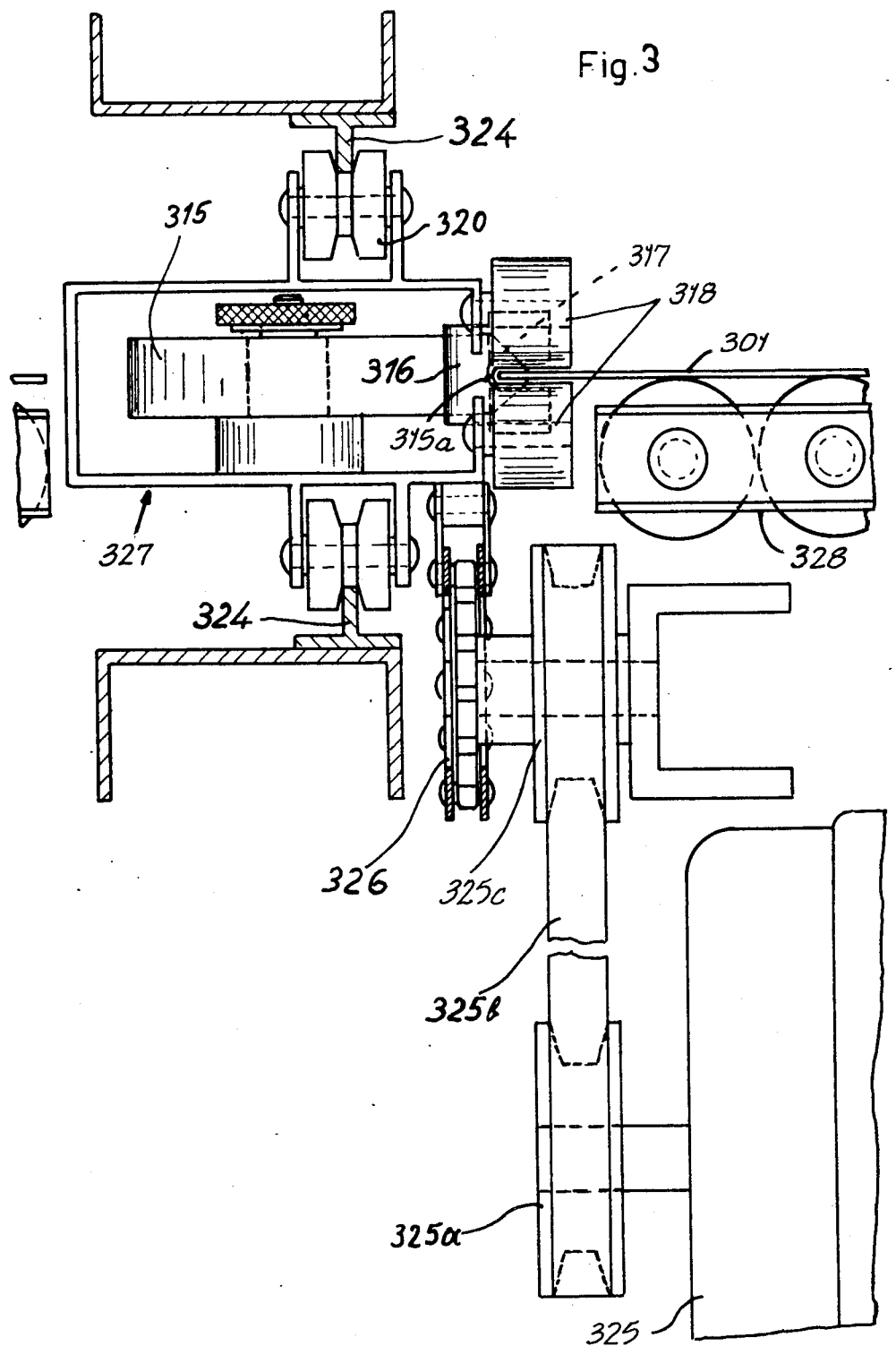
FIG. 3 shows a similar device for sheet metal edges positioned transversely of the transport direction, in cross section.

A lasting protection of the edges is attained by covering the edges with a tape. For sheet metal covered with layers of synthetic material this tape may consist of the same foil as that, with which the sheet metal is coated. Preferably the tape is made at one side as a self-adhesive tape, so that it has only to be pressed-on for attachment.

Such a device for the covering of edges with a self-adhesive tape is illustrated in FIGS. 1, 2. It comprises a carriage 323 having a bottom plate 323a, which carries an axle for a reel 315 of adhesive tape. The adhesive tape 315a is supplied over a deflector roller 316 to a pre-folding funnel 317, which folds the adhesive tape about the cut edge 301a of the sheet metal panel 301. The funnel is mounted adjustably between the bottom plate 323a and a top plate 323b. Subsequently, an upper and a lower roller 318 press the adhesive tape against the sheet metal panel, whereby it is attached thereto. At the left hand end of the carriage a cutter 321 for the adhesive tape is mounted. The carriage has both in front and on the rear, pairs of rollers 320, one pair of which runs with their grooves on the edge 301a of the sheet metal panel, and the other on a rail 319. When the device is pushed to the right, the edge 301a of the sheet metal panel is continuously covered by the adhesive tape 315a. Outside the sheet metal panel 301 the device rests on rollers 322. The device is suitable e.g. for edges lying in the direction of transport of the sheet metal panel.

For edges positioned transversely thereof, a device according to FIG. 3 is provided. In a casing 327 a reel 315 of adhesive tape is journalled. The adhesive tape 315a is supplied over a deflector roller 316 to a prefolding funnel 317, and is then pressed on to the sheet metal panel 301 by means of presser rollers 318. On the upper- and under-sides of the casing 327 pairs of rollers 320 are journalled, which run with their grooves on upper and lower rails 324. These rails are arranged above and below a roller track 328 for the sheet metal panel 301. For moving the device, an endless chain 326 is attached to the underside of the device which chain runs over sprocket wheels. One such sprocket wheel is driven from the output pulley 325a of a motor 325 through a pulley 325c and a belt 325b. By pulling the device along the sheet metal panel, the edge of the panel is covered with the adhesive tape, and subsequently the device is returned to the starting position. The covered sheet metal panel may then be carried away in the transport direction.

Figure 4:
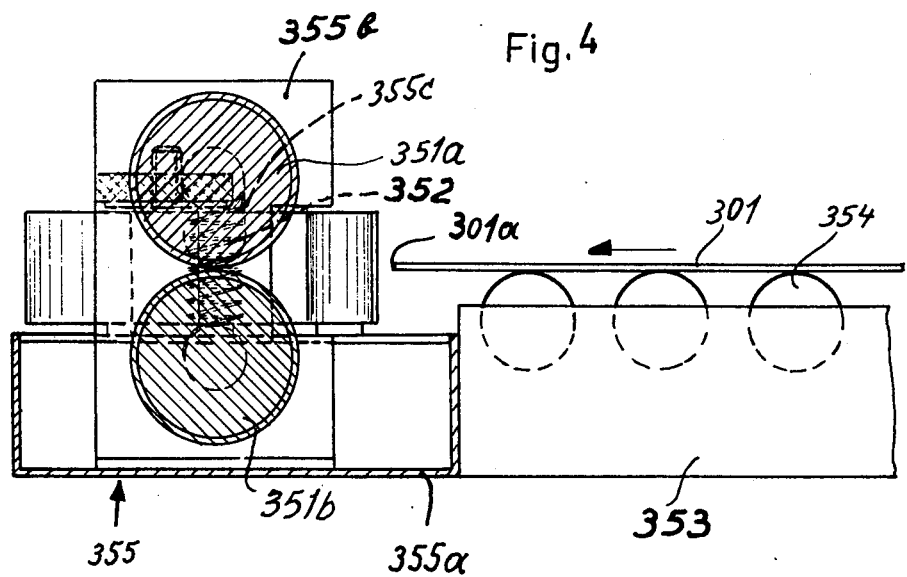
FIGS. 4 and 5 show a device for the covering of edges with a tape stretched out in front of presser rollers, in transverse section and plan view; respectively.
Figure 5:
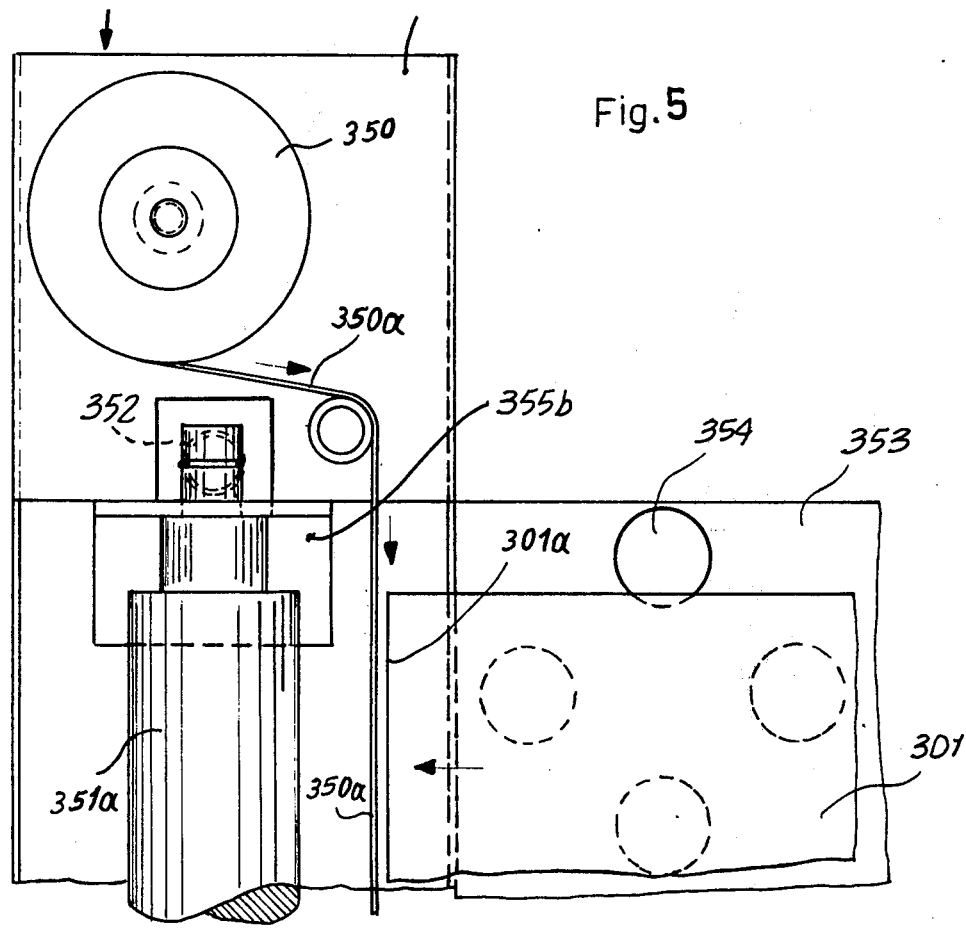

A further embodiment of a device for covering the edges with an adhesive tape is shown in FIGS. 4, 5. This device 355 comprises a hollow carrier 355a, which carries on both ends bearing plates 355b for journalling an upper presser roller 351a and a lower presser roller 351b. The upper presser roller is journalled in a vertical slot 355c and is pressed by springs 352 against the lower roller. Outside the rollers a reel 350 of adhesive tape is journalled on the carrier. The adhesive tape 350a is stretched out in front of the rollers by a deflector roller. Then the sheet metal panel 301 is pushed against the adhesive tape 350a, and then together with the adhesive tape further into the gap between the presser rollers, and finally through the presser rollers 351a, b, whereby the adhesive tape is firstly folded about the edge 301a of the sheet metal panel, and then pressed-on. Thus, by a short movement of the sheet metal panel forward and back, the edge is covered by the adhesive tape. For this purpose, the sheet metal panel 301 rests on balls 354, which are journalled in a support 353.

Figure 6:
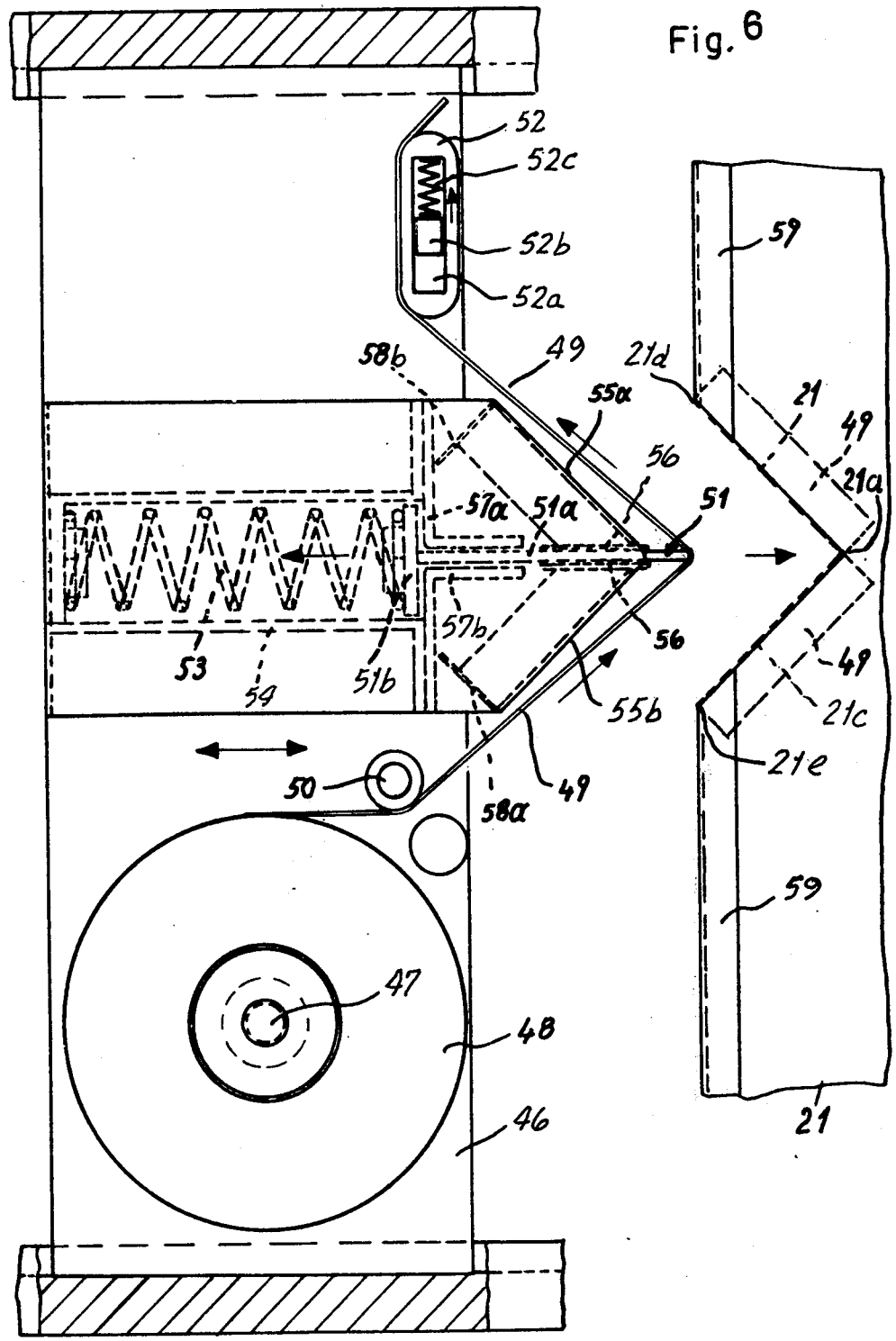
FIGS. 6 and 7 show a device for the covering of edges having receding portions, in plan view and transverse section, respectively.
Figure 7:
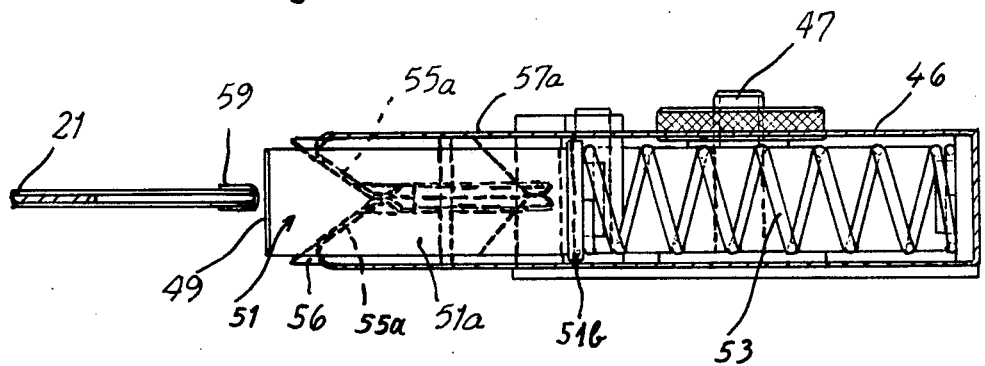
Figure 8:
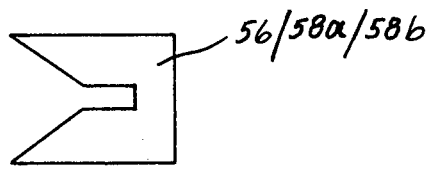
FIG. 8 shows a blade for making incisions into a tape, for a device according to FIGS. 6, 7 in elevation.

The corners can be covered likewise by an adhesive tape. The device according to FIGS. 6–8 is an embodiment for the covering of stamped-out recesses in the margin, e.g. of triangular shape, having edges 21b, 21c, which may have been previously covered with lacquer. A base plate 46 carries at one end an axle 47, over which a reel 48 of adhesive tape is pushed. The adhesive tape 49 is passed over a deflector roller 50 and a stretching means 51 for the adhesive tape whose tensioning plate 51a stands on edge perpendicular to the plane of the adhesive tape and protrudes from a pair of clamping jaws 55a, b. The plate 51a is guided between two angle profiles 57a, b, and extends with a disc 51b into a tube 54, which disc is biased outwardly by a compression spring 53. On both sides of the plate 51a there extend clamping jaws 55a, b, which are turned back inwards, and whose shape and length is adapted to the cut-outs punched from the margin. By the side of the tensioning plate 51a, blades 56, FIG. 8, are arranged for making incisions in the adhesive tape at the inner corner 21a. Blades 58a, b are also arranged on the outer ends of the clamping jaws 55a, b, for cutting of the self-adhesive tape at the outer corners 21d, e of the punched cut-outs. The tape 49 is further conducted to a tape attachment 52. Since upon the stretching means 51 for the tape abutting the work piece, the tape becomes slack, the tape attachment is provided with a longitudinal slot 52a, in which a pin 52b fixed to the bottom plate 46 is guided, and is held under spring bias by a compression spring 52c. When pushing the device towards the work piece 21, firstly the tensioning plate 51 with the adhesive tape 49 reaches the inner corner 21a; then the blades 56 make incisions in the adhesive tape; the clamping jaws 55a, b press the adhesive tape against the work piece, beginning at the outer corners 21d, e owing to the angle of the orifice slightly exceeding that of the cut-out; and the blades 58 cut it off. Thus the work piece is protected against rust, in conjunction with the adhesive tape 59 previously applied to the straight edges.

Figure 9:
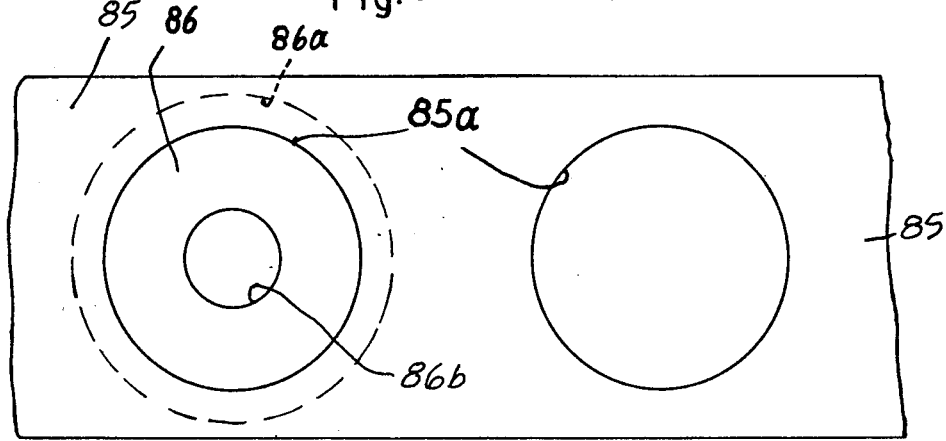
FIG. 9 shows a tension belt with an adhesive disc, in plan view.
Figure 13:
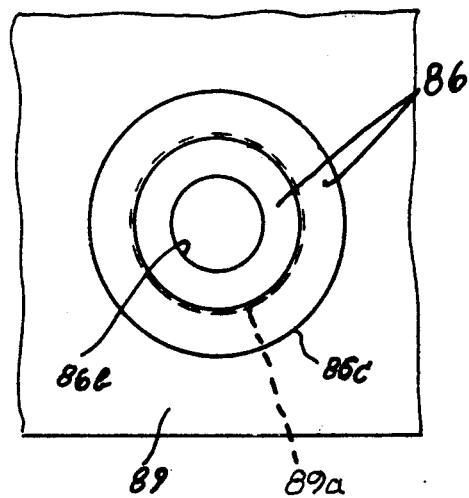

In addition to the outer edges of sheet metal panels the edges of holes within the area of the sheet metal are to be covered. For this purpose, self-adhesive rings 86 (FIG. 13) are used, whose outer diameter 86c exceeds that of the holes 89a, and whose inner diameter 86b is smaller than that of the holes. According to a first embodiment, one ring 86 is pressed from above, and one ring from below against the sheet metal 89, and is cemented-on there; moreover the inwardly protruding portions of the rings are pressed against each other and cemented to one another. Thus the edges of holes or cut-outs are protected from corrosion. A device operating on this principle is illustrated in FIGS. 10–12. For the continuous supply of the self-adhesive rings 86 of an external diameter 86a the same are firstly cemented on a tension belt 85 having punched holes 85a (FIG. 9, right hand side), concentrically to the punched holes (FIG. 9, left hand side), and the tension belt with the self-adhesive rings is rolled up in reels 85 (FIG. 10). Below and above the work piece 89 with holes 89a a tension belt 85 is stretched out in such a manner, that the self-adhesive rings 86 are in juxtaposition to the cut-outs 89a. By means of an upper and a lower stamp 87 comprising a punch 87a and die 87b, a self-adhesive ring 86 of the outer diameter 86c (FIG. 13) is produced (FIG. 11) and is pressed by the punch 87a against the work piece 89 and/or the opposite ring 86 and is cemented-on there (FIG. 12). For the purpose of holding the self-adhesive ring 86, each punch 87a has on top in its centre a holder head 87d, which can be depressed against the bias of a spring 87c. Each holder head 87d is surrounded by a rubber ring 87e, which presses the self-adhesive rings 86 within the cut-outs of the work piece against one another (FIG. 12). For the introduction of further self-adhesive rings into the device, the tension belt is wound on reels on the right hand side. A finished covered cut-out is shown in FIG. 13.

Figure 14:
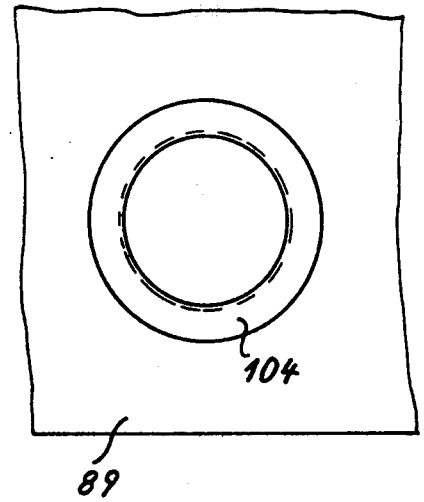
FIG. 14 shows a piece of sheet metal with a hole, covered by a single adhesive ring.
Figure 15:
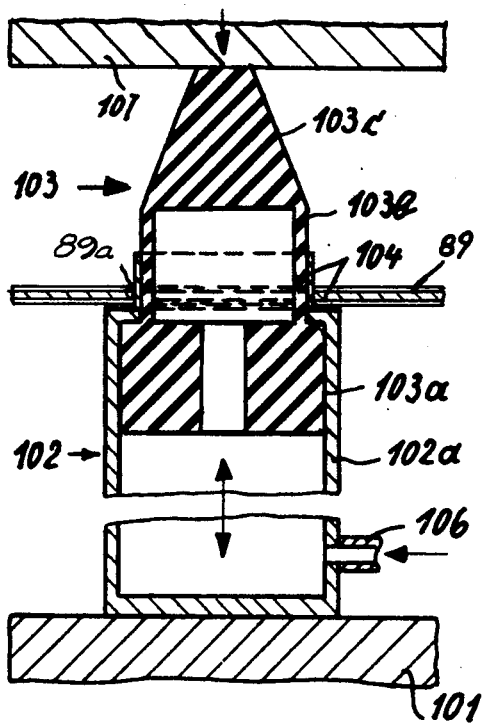
FIG. 15 shows a folding and pressing-on device for adhesive rings in sectional side elevation, during the folding-over.
Figure 16:
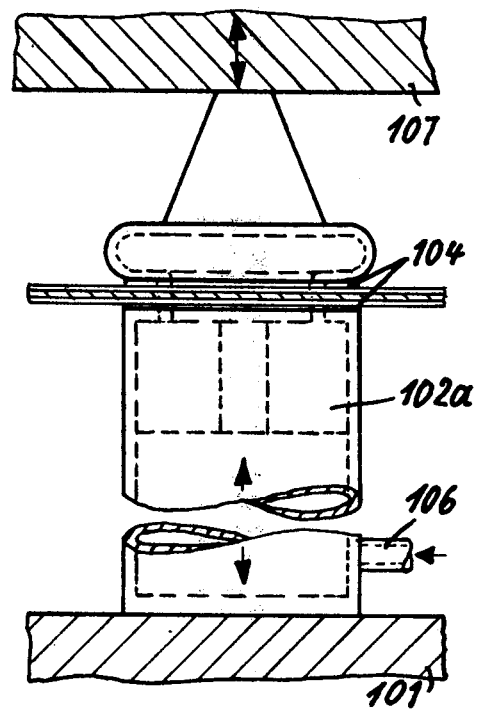

According to a second embodiment a single expandable self-adhesive ring is used for the covering. This self-adhesive ring 104 is firstly cemented with its outer periphery to the work piece; the portion protruding into the cut-out is bent through this cut-out in the work piece; and is then pressed against the work piece (FIGS. 15, 16). The device 102 comprises a cylinder 102a fixed to a carrier ledge 101 and having an air supply pipe 106. Into its upper portion a hollow body of rubber 103 is inserted, which has, within the cylinder, a thick-walled portion 103a, and outside a thin-walled cylinder 103b, and on top a solid cone 103c. The outer diameter of the thin-walled cylinder 103b is smaller by twice the layer thickness of the self-adhesive ring than the diameter of the cut-out 89a in the work piece. After pushing a self-adhesive ring 104 over the solid cone 103c the device is raised by means of the carrier ledge 101; the cone penetrates through the cut-out 89a in the work piece; the self-adhesive ring is bent up inside, and pressed on the work piece outside. Then a counter-plate 107 bears down from above on the solid cone, while compressed air expands the thin-walled cylinder 103b from inside, whereby the upstanding portion of the self-adhesive ring is pressed on the work piece. A covered cut-out is shown in FIG. 14.

The covering of the edges with a tape may be effected alternatively by welding instead of by cementing. For this purpose the coated edges of the sheet metal and the tape are to be heated to the welding temperature of the latter.

Figure 23:
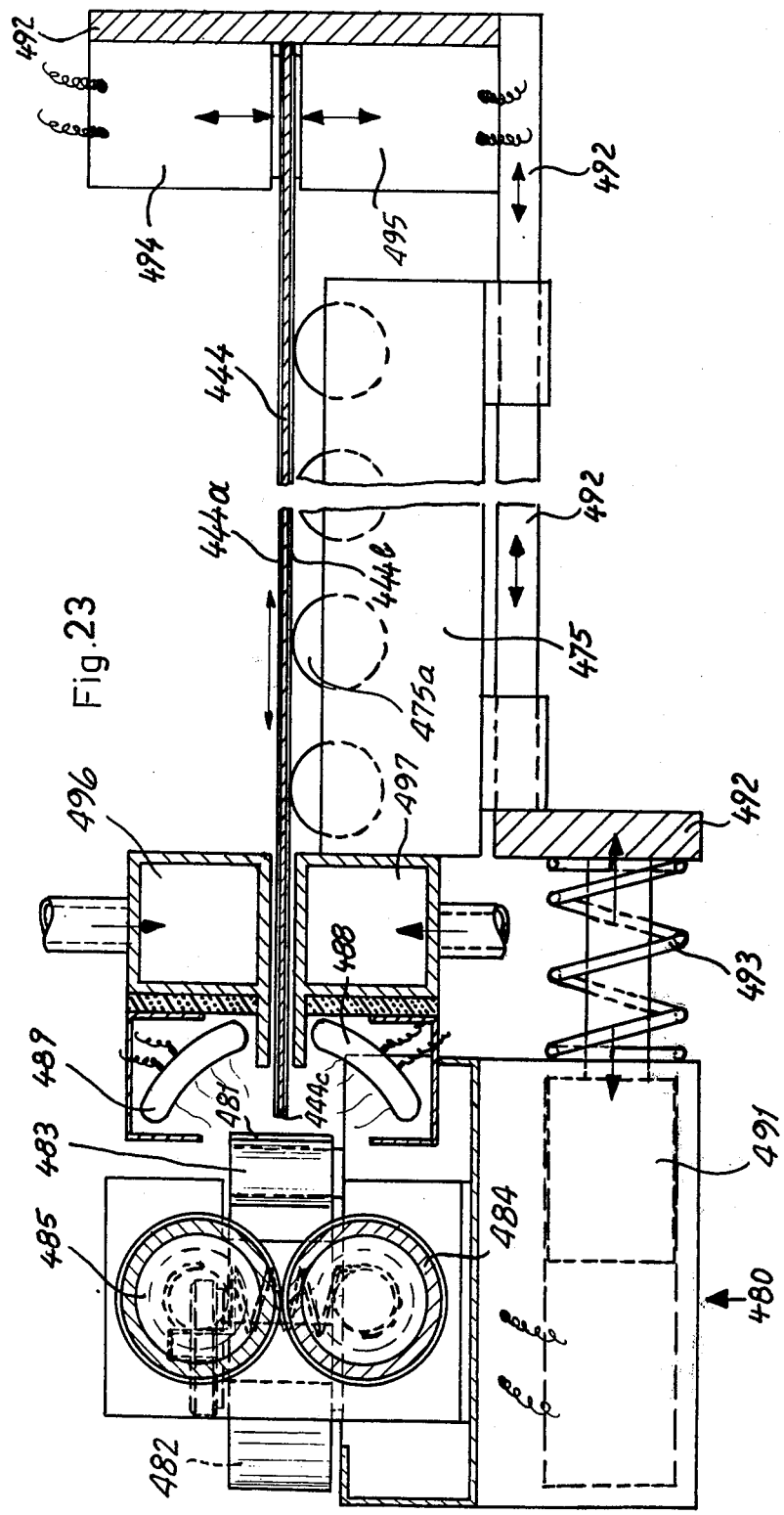
FIG. 23 shows a welding device for a stretched-out tape, with infra-red radiator, in transverse section.

According to a first embodiment, the stretched-out tape and the sheet metal panel lying in front of it, which is covered on both sides wit synthetic material, are heated by infra-red radiation to the welding temperature of the synthetic marerial, and then compressed by being pushed between rollers. A device of this kind is illustrated in FIG. 23. On a base body 480 there are journalled: two hollow rollers 484, 485, which are capable of being cooled by water and pressed against each other by springs; a reel 482 of a weldable tape 481; and a deflector roller 483. In front of the weldable tape and below as well as above the sheet metal panel 444 covered by layers 444a, b infra-red radiators 488, 489 are arranged, screened by baffles and insulating plates. Behind and below the insulation, cooling plates and water-cooled tubes 496 and 497 are arranged, in order to prevent any undesirable heating of the layers 444a, b of the sheet metal adjacent to the edge. A slider 492 mounted horizontally slidably in the base body carries a support 475 with balls 475a for the easy transport of the sheet metal panel, and two electromagnets 494, 495 for arresting the sheet metal panel while the covering is in progress. After heating the tape and layers to welding temperature, an electromagnet 491 fixed to the base body pulls the slider to the left, whereby the edge 444c of the sheet metal panel folds the weldable tape and pushes the same between the rollers, where it is pressed against the sheet metal. A spring 493 returns the slider 492 after the current has been switched off.

Figure 26:
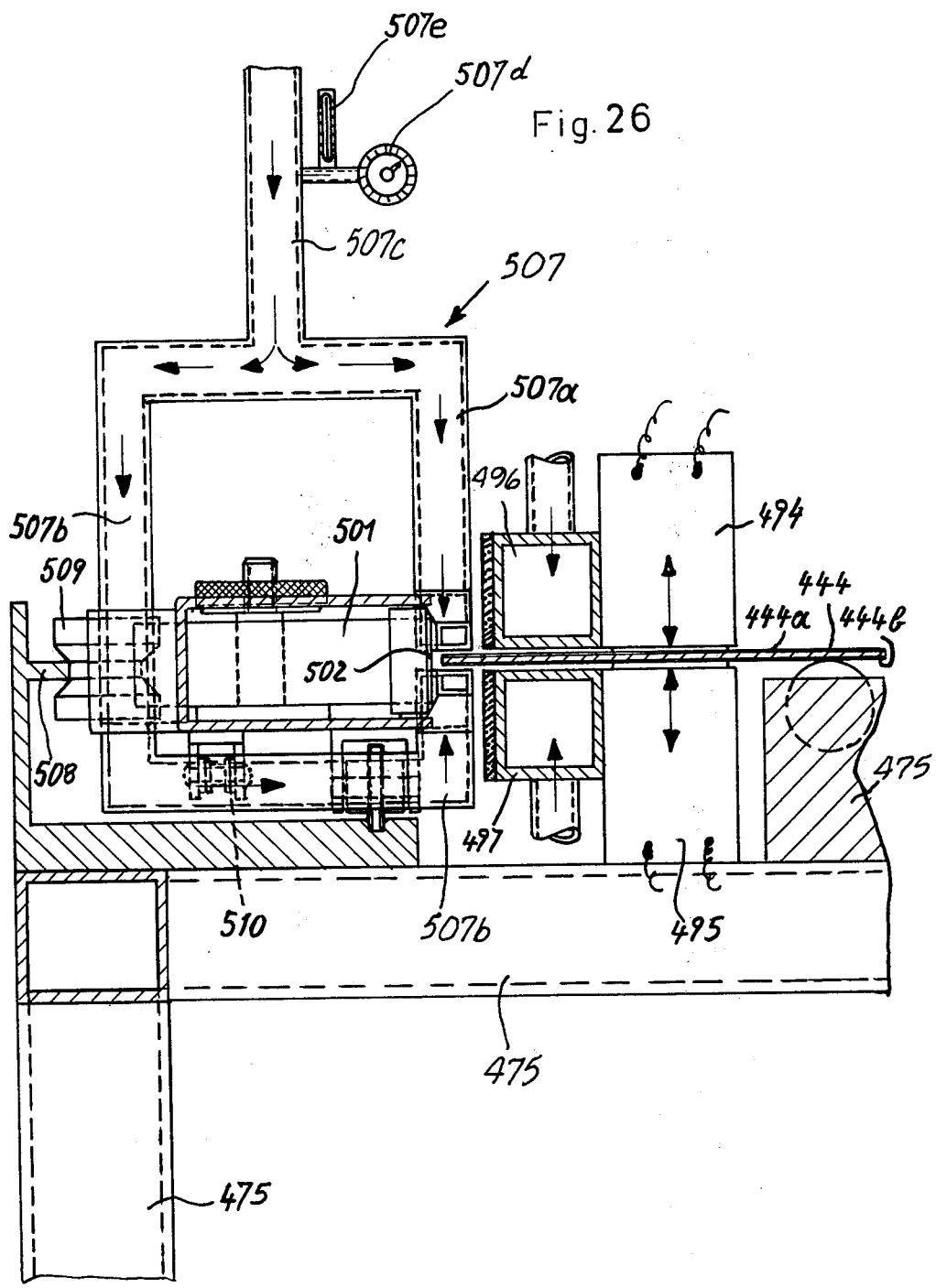

A second embodiment illustrates the heating of the components to be interwelded by means of hot air (FIGS. 24-26). The device comprises a carriage 500, which is guided on rollers 509, on the one hand along a fixed rail 508, and on the other hand along the edge of the sheet metal panel 444. The carriage 500 carries a reel 501 of a weldable tape 502, a deflector roller 503, a pre-folding funnel 504 and two presser rollers 505, 506. A chain 510 pulls the carriage 500 along the edge. In front of the pre-folding funnel 504 a hot air device 507 is arranged. An upper and a lower hot air duct 507a, b, whose supply pipe 507c is provided with a thermometer 507e and a thermostat 507d, issues closely above the edges of the sheet metal and by the side of the adhesive tape 502, and raises the same to its welding temperature during the run of the presser rollers 505, 506. Adjacent the edge to be welded, the layers 444a, b of the sheet metal panel are protected by a cooling device. The latter comprises an upper and a lower cooling tube 496, 497, each with a lateral insulation. Holder magnets 494, 495 retain the sheet metal piece lying on a roller track 475. The weldable tape and the layers of the sheet metal panel are heated to welding temperature of the synthetic material and are then interwelded by the presser rollers 505, 506.

Instead of a weldable tape, a weldable cord 511 may be used in accordance with FIGS. 27, 28. The carriage 500 is provided with the same hot air device 507, has however, in continuation a presser roller 512, and for further deformation a pair of forming rollers 513a, b and a pair of presser rollers 514a, b, so that the weldable cord is placed like a tape about the cut edge. Cooling and holding means are the same as in the preceding Figures.

In addition to the straight and curved edges, also the cut edges in corners and in the angles included e.g. between two turned-up margins of a sheet metal piece are to be protected from corrosion. An embodiment using weldable cords is shown in FIGS. 29, 30. A sheet metal panel 531 covered with layers on both sides, has on the left hand side a downwardly directed angular turn-up 531a, and on the forward side (FIG. 30) a downwardly turned angular turn-up 531b, which turn-ups are in turn provided with turn-ups 531c, d. For the purpose of covering the corner gap of the turn-ups 531a, b serves a device 540. This device comprises a base plate 540a for supporting the sheet metal panel, which plate carries on a downwardly directed arm 540b a hand-operated lever 537 for introducing an inner heating means 545, and a hand-operated lever 543 for pressing-on a presser plate 544 articulated to the base plate. On an upwardly directed extension 540c of the base plate, an external heating means may be attached, which consists in a tube 542 for hot air and is directed on the corner gap as well as on the outer weldable cord 541. The inner heating means 545 comprises a body, which fills the space between the sheet metal panel and the turn-ups and has a groove 545a and is provided with electrical heating. It heats the insides and an internal weldable cord 534. After heating the cord to welding temperature, the levers 537, 543 and accordingly the presser plate 544 and the heater body 545 are pressed against each other, and the weldable cords 534, 541 are interwelded with the coated sheet metal panels 531a, b. For this protection of the outer layers, cooling tubes 533a, b are provided.

For the use of rust-protective devices on sheet metal panels, which are treated on a production line, the treatment devices are to be brought for short periods to the sheet metal panels, and are to be returned after the treatment to a remote position. For this purpose the individual devices are provided with advance devices, and the movements towards and away from the sheet metal panels are automatically controlled. Such an advance device may comprise a casing with an advance means and a slider moved by the latter, which carries a treatment device. By lowering the advance device into abutting an end switch, the advance and the treatment are initiated, and by abutting another end switch the same are switched off, and the device is returned to the remote position.

For use as an advance means, a compressed air jack may be provided, and for the treatment, a device for the application of liquid rust-protective agents may be provided.

Apart from simple sheet metal panels, even formed and interwelded sheet metal panels may be protected from rust on their edges. This will be shown with reference to the door of a motor car body composed of interwelded sheet metal panels.

The edges may be covered by an adhesive tape. For this purpose an adhesive tape is pressed to the arcuate edges from outside by means of an adhesive tape-covering machine, and the protruding half of the tape is horizontally folded over on to the cut edges. The adhesive tape is streched out over the straight edges by means of a holder belt capable of being severed. Then, clamping jaws, which are capable of being lowered, bend all the adhesive tapes downwardly about the edges, and press the same on to the work piece, e.g. by the aid of inflatable hoses.

Figure 17:
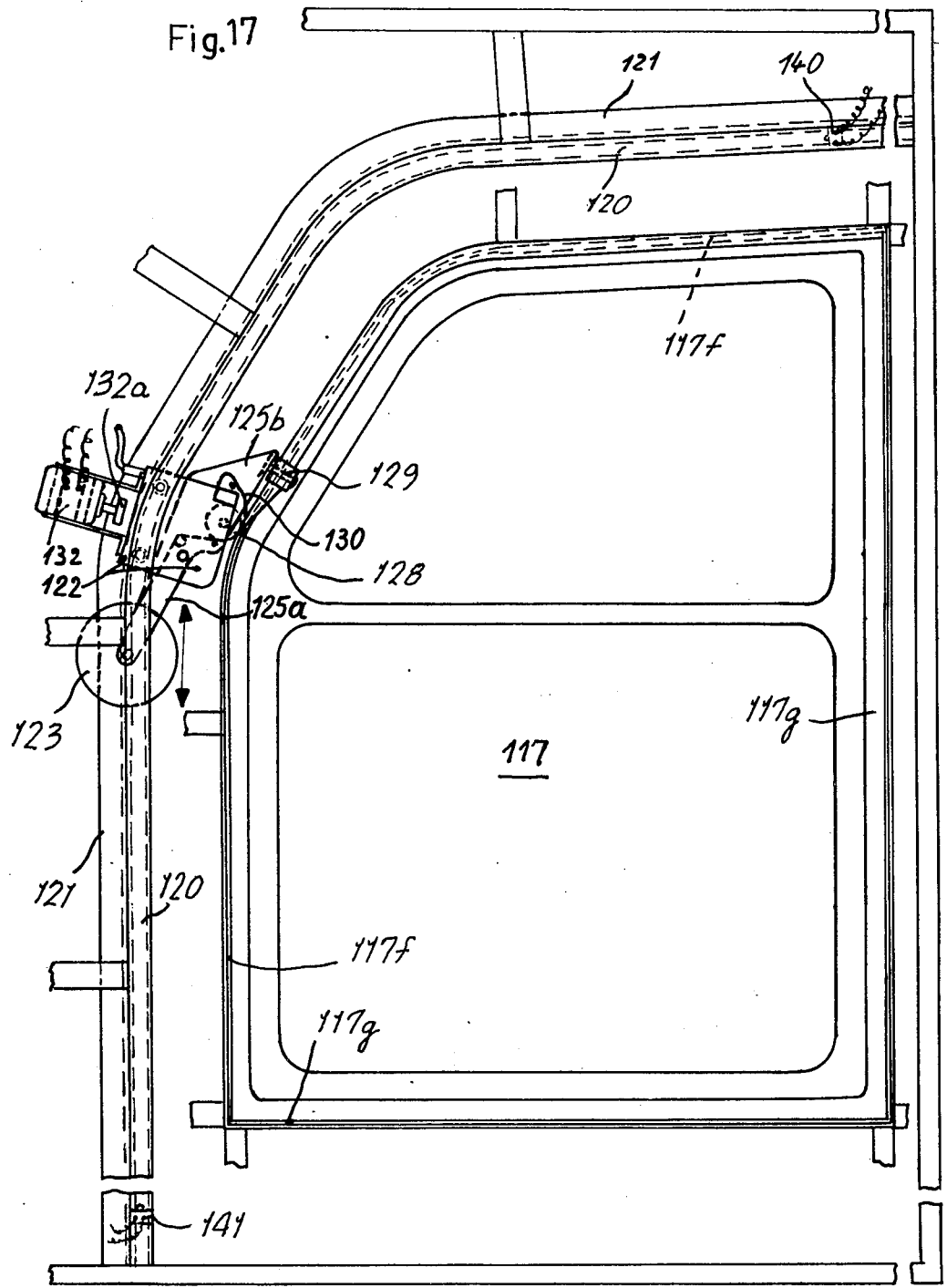
FIG. 17 shows a device with a rail and carriage for covering the curved edges of the door of a motor car body, in plan view.
Figure 18:
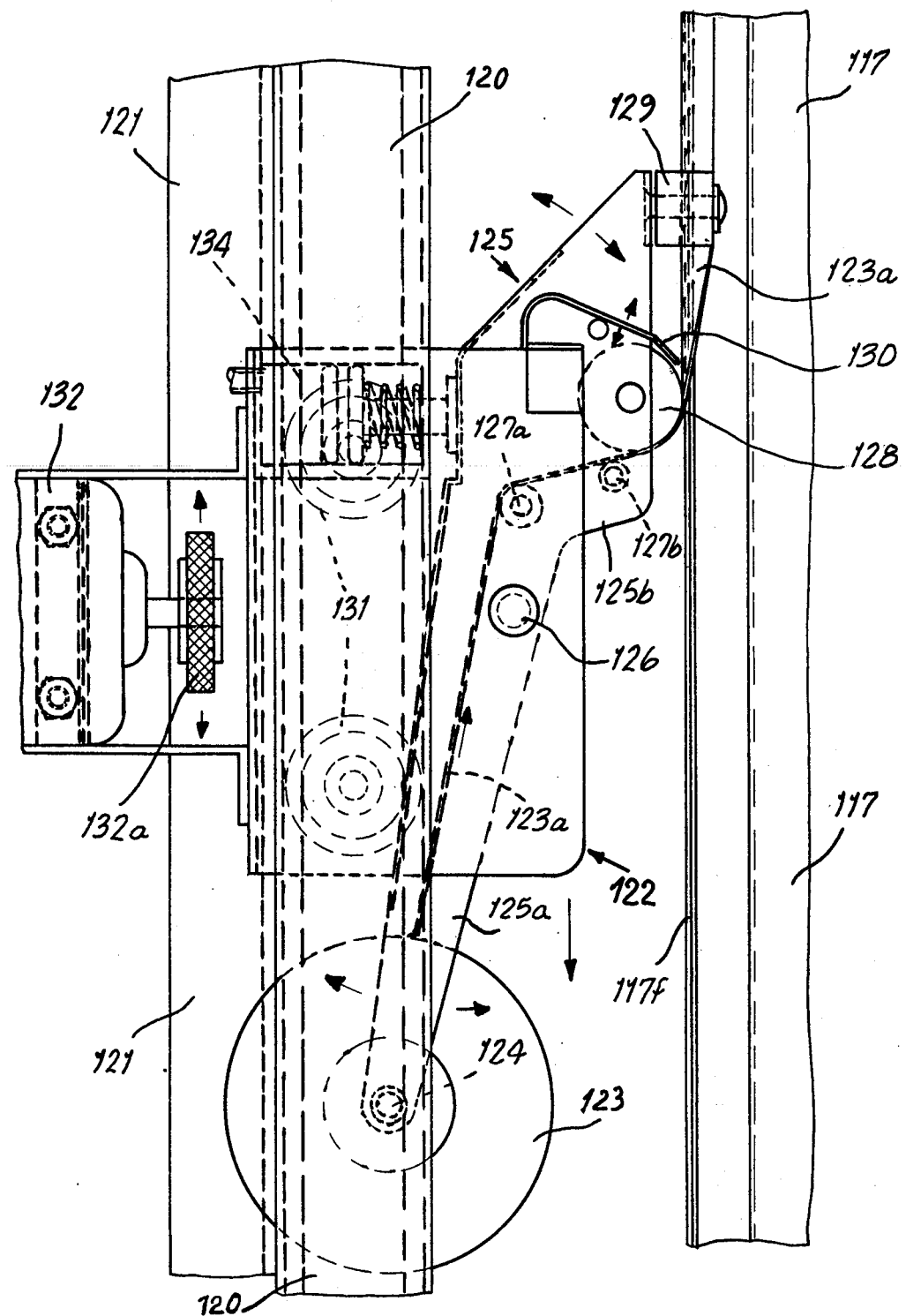
FIG. 18 shows on a larger scale the carriage with storage reel for the tape and drive, in plan view.
Figure 19:
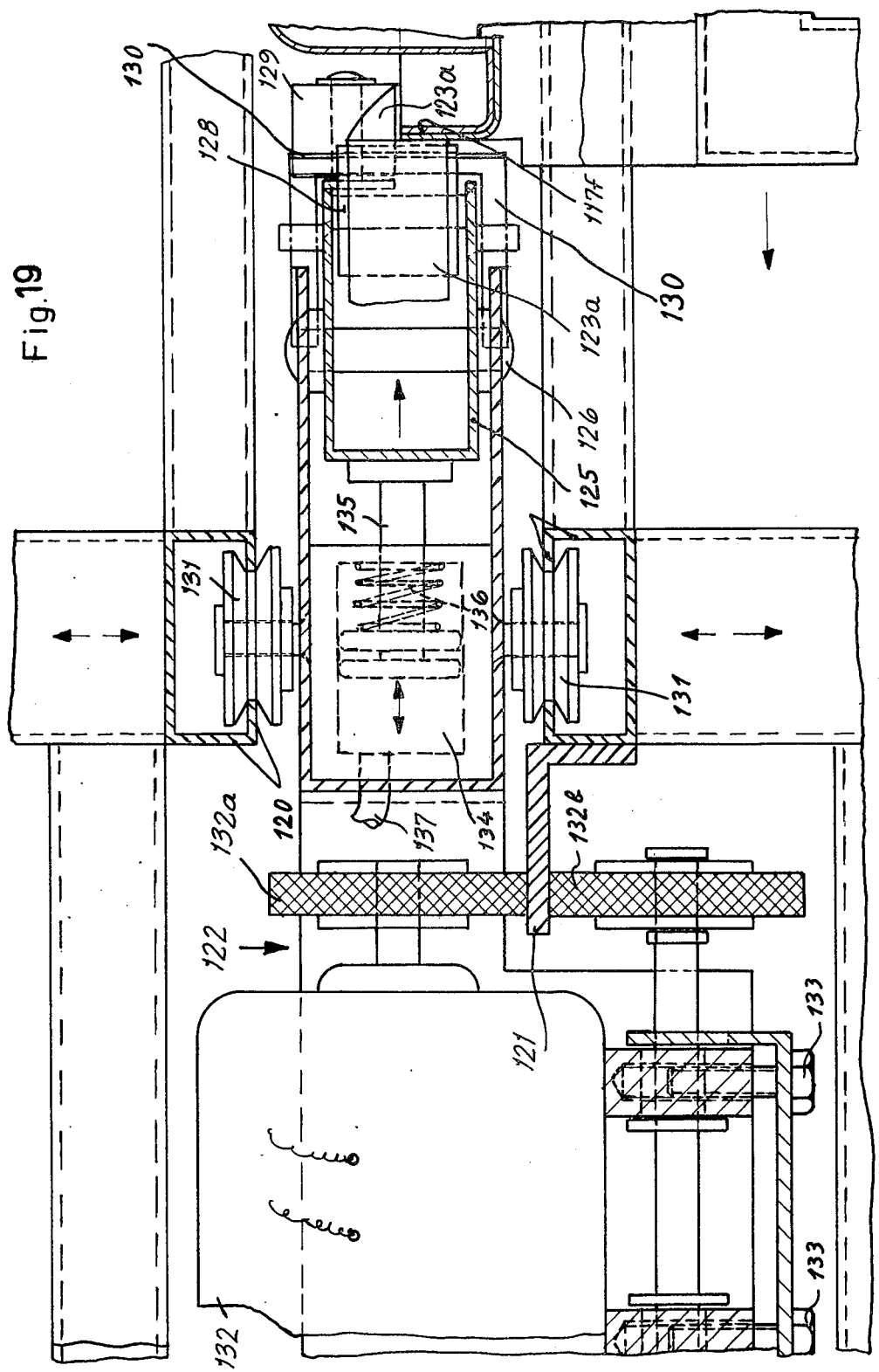
FIG. 19 shows on yet a larger scale a transverse section of the rails, the carriage and the door of the motor car body.

The covering device for the arcuate edges 117f is guided in rails parallel to the edges. This device comprises in accordance with FIGS. 17-19 a shallow casing 122; a two-armed lever 125 pivoted on an axle 126 whose one arm 125a carries on an axle 124 a reel 123 of adhesive tape, and whose other arm carries two guide rollers 127a, b, a presser roller 128 for the adhesive tape 123a, and a folding-over roller 129; a cutting-off blade 130, a pneumatic pressing-on device for the presser roller 128, which is composed of a cylinder 134, a piston rod 135, a return spring 136 and a compressed air pipe 137; rollers 131 mounted on the upper surface of the casing and underside thereof, whose grooves are guided on C-shaped rails 120; and a drive consisting in an electric motor 132 fixed to the casing with a friction wheel 132a and an opposite wheel 132b to be pressed on the latter by screws 133 below a runner rail 121. At the beginning of the guide rails there is mounted a switch 140, which closes the circuit for the electric motor 132 and the compressed air supply 137, and at the end of these rails there is a switch 141, which cuts off the supply of compressed air and changes the polarity of the electric motor 132 for the return run. The guide rails with the covering device for the edges are mounted on a frame, which may be lowered for the treatment of the door, and raised for the latter being transported away.

Figure 20:
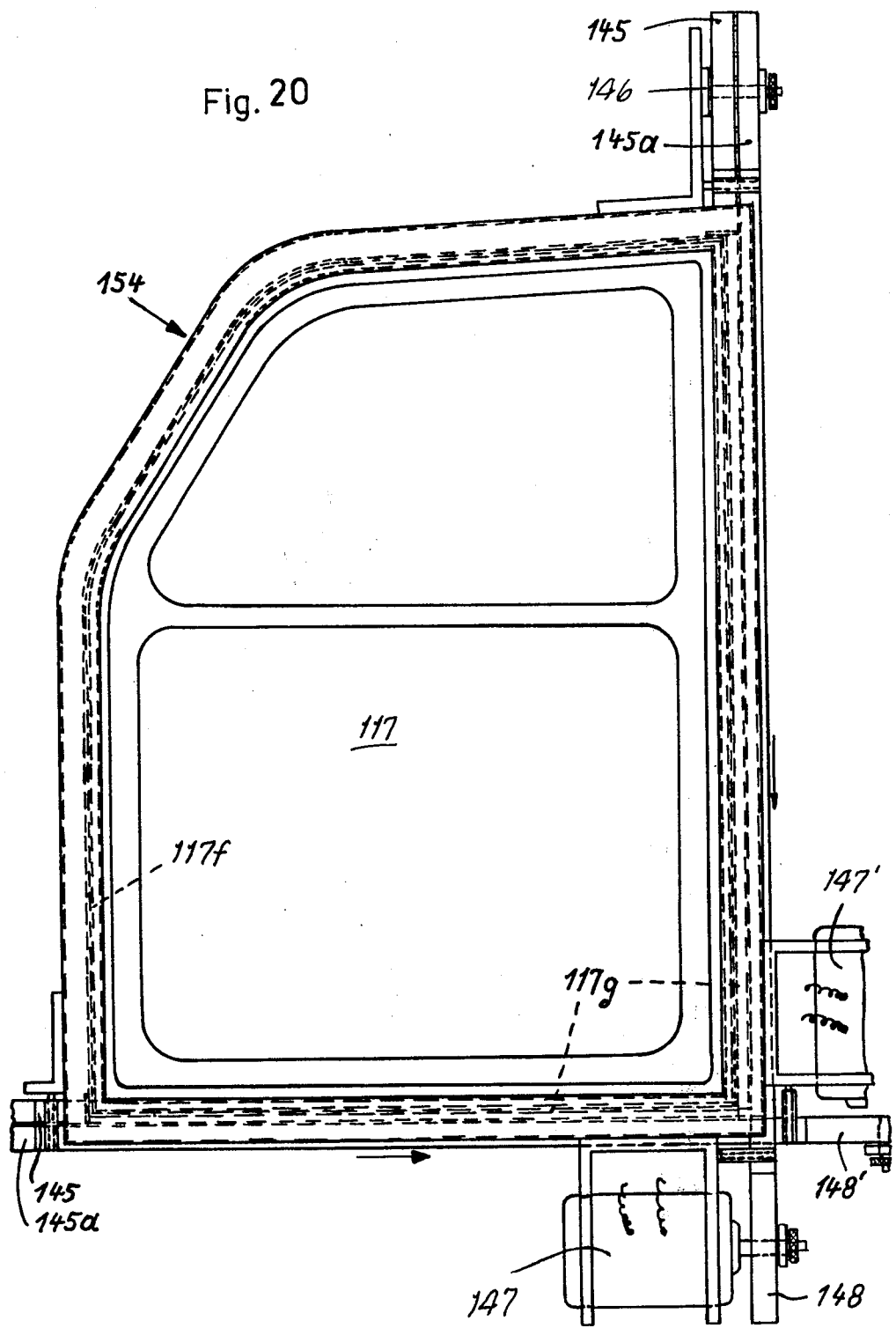
FIG. 20 shows two means fixed to a common frame, for stretching out an adhesive tape for covering the straight edges of the door of a motor car body, in plan view.
Figure 21:
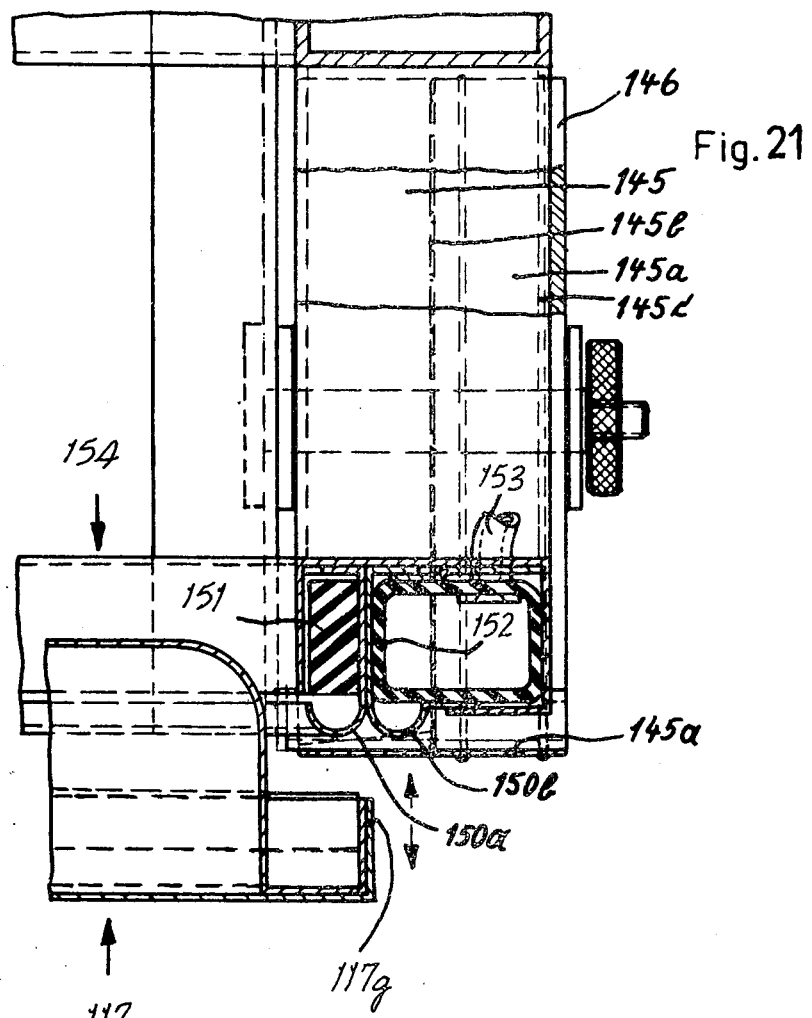
FIG. 21 shows the frame, provided with a presser device for the margin, prior to the pressing operation, in transverse section, FIG. 22 corresponds to FIG. 21 and shows the stage of pressing the adhesive tape to the edges of the door of the motor car body.

For mechanically stretching out an adhesive tape for the straight edges 117g of the door 117 a belt is used, which is subdivided in the longitudinal direction (FIG. 21), half of which is made an adhesive tape 145 and the other half a tension belt reinforced by threads 145c of synthetic plastics and capable of being torn off the adhesive tape 145 by the aid of short bars 145b. In accordance with FIG. 20 a storage reel 146 of the complete belt is journalled on one side of the door edge to be covered, and another reel 148 for winding the belt 145a upon it is journalled on the other side of it. By turning the reel 148 stepwise by the aid of the motor 147, the adhesive tape is stretched out. In FIG. 20 a second identical stretching-out device 146', 147' is provided for the second door edge, which lies at a right angle to the first one.

Figure 22:
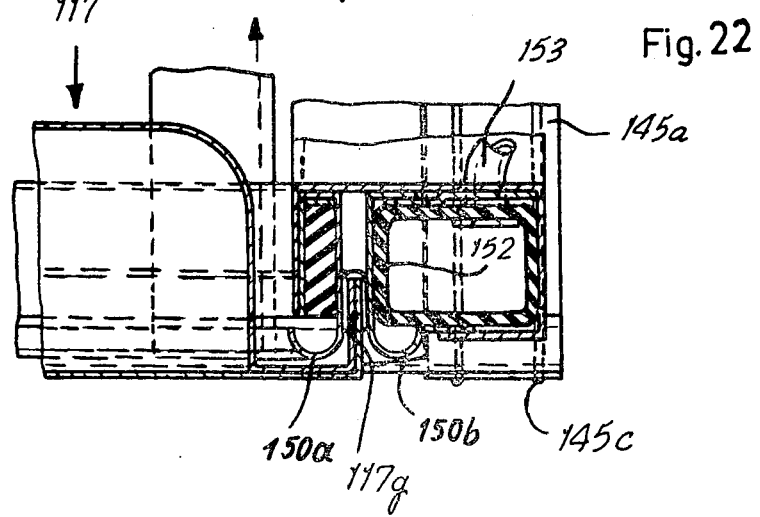

The storage- and winding-up reels with their drive are mounted on a frame 154, which can be lowered on the door with the adhesive tapes stretched out. This frame carries inner and outer clamping jaws along the door edges, which jaws band the adhesive tape 123a about the arcuate edges 117f as well as the adhesive tapes 145 about the edges 117g, and sever the same from the tension belts 145a. Laterally of the inner clamping jaw 150a a block of rubber 151, and laterally of the outer clamping jaw 150b a hose 152 is mounted, which is inflatable by an air supply pipe 153. When inflated, the air hose bears on the clamping jaws, and the latter press the adhesive tapes on the side faces of the edges 117g (FIG. 22). After the pressing-on, the air is vented, the frame with the stretching-out and pressing-on device is raised, and the door is transported further on.

I claim:

1. Apparatus for laminating a protective laminate to the cut edge of sheet metal otherwise coated with a corrosion-proof layer, for protecting the cut edge of the sheet metal from corrosion, comprising: storage means providing a source of the corrosion resistant laminate in a continuous indefinite length in coiled form mounted for rotation about an axis to facilitate withdrawal of said laminate material in an elongated form from said coil; means for guiding the indefinite length laminate from the coil form to an elongated form adjacent to and generally corresponding to the contour of the cut edge of the sheet metal to be protected from corrosion, said guide means including a generally U-shaped fixed guide channel having its web portion decreasing in width and its legs continuously becoming more closely spaced together from one end to its opposite end, so that the laminate in tape form entering its one end will exit its opposite end in U-shaped folded form around the sheet metal edge, and a plurality of tape pressing rollers having their axes transverse to the tape and at angles with respect for each other for engaging respectively the tape portion engaging the cut sheet metal edge and the tape portions engaging the coated areas of the sheet metal adjacent the cut edge; means for moving said laminate is elongated form transverse to its length toward the adjacent sheet metal cut edge and pressing said laminate onto said sheet metal cut edge and onto the coated areas of said sheet metal adjacent said cut edge to permanently bond said laminate to said sheet metal cut edge and the coated areas of sheet metal adjacent said cut edge; means for retaining the sheet metal in a fixed position; a plurality of guide rails in fixed position parallel to the cut edge of the sheet metal cut edge in its fixed position; a support carriage having mounted thereon said storage means and said means for guiding, and including a plurality of guide rollers engaging said guide rails so that said carriage may be moved parallel to and at a fixed distance from said sheet metal cut edge; power means for driving said carriage along said guide rails, and means immediately adjacent said laminate when elongated for heating both said laminate and said sheet metal cut edge prior to assembly; heat insulation and heat sink means immediately adjacent the opposite coated surfaces of said sheet metal spaced from said cut edge so as to prevent substantial heating of said sheet metal apart from the area where it will be directly engaged by the laminate after assembly.

2. The apparatus of claim 1, including said means for heating including means for providing pressurized hot air and nozzle means for directing the pressurized hot air along the inside of the tape as it is folded into its U-shaped by the guide means, between the cut edge and tape.

3. Apparatus for laminating a protective laminate to the cut edge of sheet metal otherwise coated with a corrosion-proof layer, for protecting the cut edge of the sheet metal from corrosion, comprising: storage means providing a source of the corrosion resistant laminate in a continuous indefinite length in coiled form mounted for rotation about an axis to facilitate withdrawal of said laminate material in an elongated form from said coil; means for guiding the indefinite length laminate from the coil form to an elongated from adjacent to and generally corresponding to the contour of the cut edge of the sheet metal to be protected from corrosion; means for moving said laminate in elongated form transverse to its length toward the adjacent sheet metal cut edge, and pressing said laminate onto said sheet metal cut edge and onto the coated areas of said sheet metal adjacent said cut edge to permanently bond said laminate to said sheet metal cut edge and the coated areas of sheet metal adjacent said cut edge; means for retaining the sheet metal in a fixed position; a plurality of guide rails in fixed position parallel to the cut edge of the metal cut edge in its fixed position; a support carriage having mounted thereon said storage means and said means for guiding, and including a plurality of guide rollers engaging said guide rails so that said carriage may be moved parallel to and at a fixed distance from said sheet metal cut edge; and power means for driving said carriage along said guide rails; means immediately adjacent said laminate when elongated for heating both said laminate and said sheet metal cut edge prior to assembly, the heat insulation and heat sink means immediately adjacent the opposite coated surfaces of said sheet metal spaced from said cut edge so as to prevent substantial heating of said sheet metal apart from the area where it will be directly engaged by the laminate after assembly.

4. The apparatus of claim 3, wherein said means for moving includes a thermostatic control to prevent such movement until the temperature of the laminate and cut edge are sufficient for bonding.

5. The apparatus of claim 3, further including a switch means at each of the opposed ends of said guide rails to be engaged by said carriage at the extreme positions of said carriage along said rails corresponding to the opposite ends of the cut edge, said switch means controlling the operation of said power means.

6. The apparatus of claim 3, further including a knife means for cutting off the length of laminate after it has completely covered the cut edge of the sheet metal.

7. Apparatus for laminating a protective laminate to the cut edge of sheet metal otherwise coated with a corrosion-proof layer, for protecting the cut edge of the sheet metal from corrosion, comprising: storage means providing a source of the corrosion resistant laminate in a continuous indefinite length in coiled form mounted for rotation about an axis to facilitate withdrawal of said laminate material in an elongated form from said coil; means for guiding the indefinite length laminate from the coil form to an elongated form adjacent to and generally corresponding to the contour of the cut edge of the sheet metal to be protected from corrosion; means for moving said laminate in elongated form transverse to its length toward the adjacent sheet metal cut edge and pressing said laminate onto said sheet metal cut edge and onto the coated areas of said sheet metal adjacent said cut edge to permanently bond said laminate to said sheet metal cut edge and the coated areas of sheet metal adjacent said cut edge, and wherein said guide means includes means for stretching the laminate in tape form parallel to and immediately adjacent the cut edge of said sheet metal, parallel pressers mounted on the opposite side of the tape from the sheet metal edge and extending parallel to and for the full length of the sheet metal cut edge, means mounting said pressers for movement towards and away from each other within a plane generally perpendicular to the sheet metal and parallel to the cut edge, means biasing said pressers towards each other, means for moving said pressers and sheet metal relatively toward each other so that the sheet metal will force the tape into engagement with said pressers and through said pressers to cam said pressers away from each other against their bias to fold and press said tape onto the opposite coated surfaces of the sheet metal adjacent the cut edge.

8. The apparatus of claim 7, wherein said means for biasing said pressure includes a solid elastomeric material biasing one of said pressers towards the other of said pressers, and an elongated elastomeric expansible chamber extending for substantially the full length of the other of said pressers for selectively expanding and contracting under fluid pressure to move the other of said pressers towards and away from, respectively, the one of said pressers, and means providing pressurized fluid selectively into said elastomeric expansible chamber.

9. Apparatus for laminating a protective laminate to the cut edge of sheet metal otherwise coated with a corrosion-proof layer, for protecting the cut edge of the sheet metal from corrosion, comprising: storage means providing a source of the corrosion resistant laminate in a continuous indefinite length in coiled form mounted for rotation about an axis to facilitate withdrawal of said laminate material in an elongated form from said coil; means for guiding the indefinite length laminate from the coil form to an elongated form adjacent to and generally corresponding to the contour of the cut edge of the sheet metal to be protected from corrosion; means for moving said laminate in elongated form transverse to its length toward the adjacent sheet metal cut edge and pressing said laminate onto said sheet metal cut edge and onto the coated areas of said sheet metal adjacent said cut edge to permanently bond said laminate to said sheet metal cut edge and the coated areas of sheet metal adjacent said cut edge, and means for stretching a carrier tape having thereon the laminate parallel to and closely spaced from said sheet metal edge and thereafter removing the carrier tape.

10. The apparatus of claim 9, further including take up storage reel means for taking up the carrier tape after the laminate tape has been removed and bonded onto the sheet metal cut edge.

* * * * *